A. H. FISHER.
AUTOMOBILE TIRE.
APPLICATION FILED JUNE 25, 1912.
1,080,818.
Patented Dec. 9, 1913.
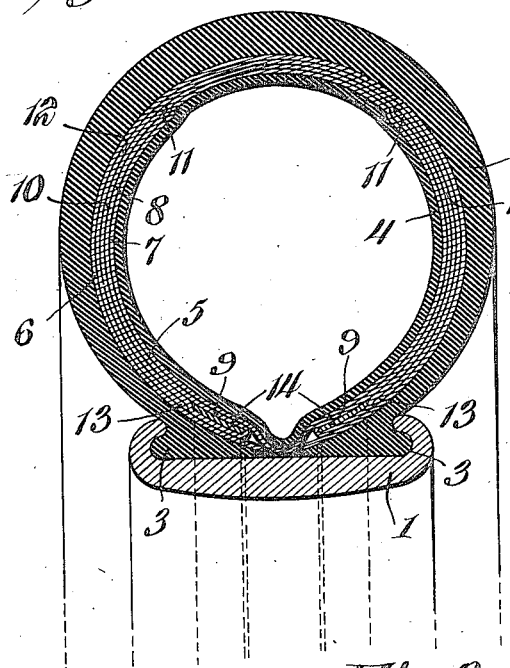
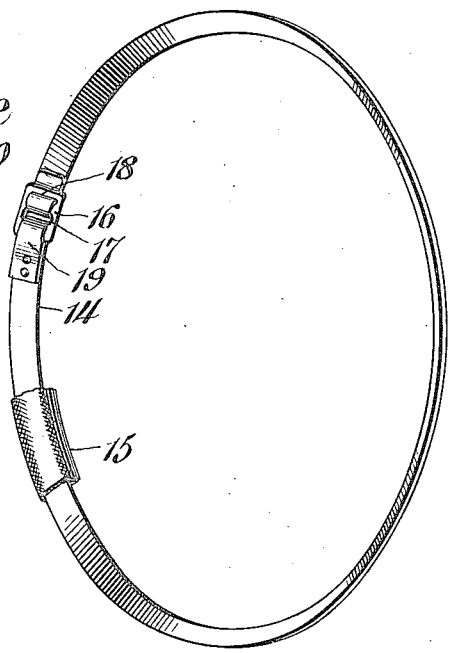
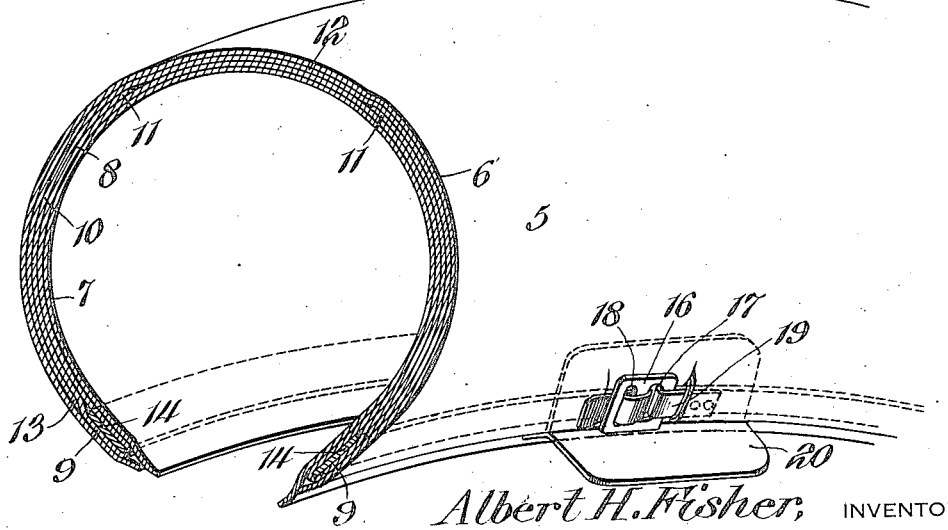
WITNESSES
Howard D. Orr
F. T. Chapman
Albert H. Fisher, INVENTOR,
BY E. G. Siggers
ATTORNEY

UNITED STATES PATENT OFFICE.

ALBERT H. FISHER, OF LINCOLN, NEBRASKA.

AUTOMOBILE-TIRE.

1,080,818. Specification of Letters Patent. Patented Dec. 9, 1913.

Continuation of application Serial No. 622,098, filed April 19, 1911. This application filed June 25, 1912. Serial No. 705,890.

*To all whom it may concern:*

Be it known that I, ALBERT H. FISHER, a citizen of the United States, residing at Lincoln, in the county of Lancaster and State of Nebraska, have invented a new and useful Automobile-Tire, of which the following is a specification.

This invention has reference to improvements in sub-casings for pneumatic tires, and its object is to provide a sub-casing or reliner which may be applied to the interior of outer casings outside the inner tube, whereby a weakened outer casing is relieved from the strain or pressure of the inflated inner tube, and consequently the life of the outer casing is proportionately prolonged.

Sub-casings, which are also known as inner tire protectors, reliners, or inner shoes, are of general tubular form adapted to fit the inner wall of the outer casing to which such a sub-casing may be applied, but as heretofore constructed such sub-casings or reliners depend almost wholly upon how well they are united to the inner wall of the outer casing, while they give but little protection near the rim, at which latter point blow-outs are likely to occur, and, again, many reliners as heretofore made have caused trouble owing to being heavy or stiff at the tread, which, while useful in the prevention of punctures, at the same time does not allow the tire to bend in at the natural place and thus cause the generation of heat resulting in the burning out of the inner tube when anything like high speed or continuous driving is attempted.

In accordance with the present invention the sub-casing or reliner is so constructed that its meeting edges are practically together when installed in an outer casing and the inner tube is inflated, while endless bands are provided adjacent the meeting edges of the sub-casing in such manner as to bear against the inner faces of the clencher beads of the outer casing, whereby the strain of this part of the sub-casing is brought opposite those portions of the rim designed to withstand the strain, and the outer casing is thereby effectually protected from blow-outs adjacent the rim.

The invention will be best understood from a consideration of the following detailed description taken in connection with the accompanying drawings forming a part of this specification, which drawings illustrate a practical form of the invention, but since the latter is susceptible of various changes and modifications in its practical embodiments over and above the exact showing of the drawings, the invention is not limited to any strict compliance with such showing.

In the drawings:—Figure 1 is a radial section through a pneumatic tire with the sub-casing or reliner of the present invention applied. Fig. 2 is a perspective view of a short section of the sub-casing or reliner detached from the tire. Fig. 3 is a perspective view of one of the bands carried by the edge portions of the sub-casing and also showing in connection therewith a small part of a covering material which may be used for the band.

Referring to the drawings, there is shown in Fig. 1 a rim 1 which may be taken as typical of any suitable form of rim such as is used in vehicles employing pneumatic tires, and more especially in automobiles, and while for convenience of illustration the rim is shown as of the ordinary clencher type, it will be understood that the rim may be of the quick-detachable or any other type. There is also shown in Fig. 1 an outer casing 2 having the edges formed into clencher beads 3 adapted to the rim 1, and this casing may be taken as typical of any suitable form of casing and not as necessarily limited to the particular shape shown. In the drawings no attempt has been made to show the usual canvas reinforcement and rubber-coating of the casing 2, but it will be understood that the casing is assumed to be made in accordance with the usual practice. There is also shown an inner tube 4 designed to contain air under pressure, and this tube may also be taken as typical of any suitable inner tube, since the particular construction of either the outer casing or the inner tube does not enter into the present invention.

It often transpires that pneumatic tires employed on vehicles such as automobiles become weakened by wear of the outer casing or from other causes affecting the outer casing, so that such outer casing can no longer withstand the pressure employed, wherefore it becomes useless and must then be discarded even though aside from its inability to withstand the internal pressure it may be capable of comparatively long use. It is for the purpose of extending the life of the outer casing that attachable sub-casings or reliners are provided, and while such sub-casing may be applied to the outer casing when the latter is first put into use, it is usually the custom to apply the sub-casing after the outer casing has become so weakened that it may no longer be safely used without the reinforcement of such sub-casing, which latter is usually made of canvas or other like strong material, provided in a suitable number of layers united to form a tube open along the inner portion similar to the outer casing, so as to be readily applied to the interior of the outer casing and to then receive the inner tube. In the drawings such a sub-casing or reliner is indicated at 5 and may be provided with an outer surfacing of adhesive material which will cause it to unite with the inner surface of the outer casing with sufficient tenacity to maintain its union therewith. The casing is usually made of a number of layers of rubber or frictioned fabric with the plies securely vulcanized together to prevent the least chance of one slipping upon the other, for the grinding or wear which would result from such slipping would soon render the reliner useless. While not limited to any particular number of layers of fabric it is customary to employ an outer layer 6, an inner layer 7, another layer 8 outside the inner layer 7 and formed adjacent the marginal edges of the inner layer 7 into loops 9, one near each edge of the reliner, and to carry this layer back approximately to the tread portion, as indicated at 10, but stopping short of said tread portion, the terminal edges of the portion 10 of the layer 8 being indicated at 11. Between the outer layer 6, the tread portion of the layer 8 and the return portions 10 of the layer 8 is another layer 12 continued toward the edge portions of the reliner to about the loops 9, where this layer terminates, as indicated at 13. Each loop 9 incloses an endless band 14 which may be a flat band of metal of appropriate gage and width and of frusto-conical form, that is, one edge is of less diameter than the other, the edge of smaller diameter being directed toward the respective edge of the sub-casing. The band 14 may be a steel band without joint, or it may be made with a joint of any type and may also be made of any other material than steel, but even if made with a joint it is effectively an endless band. The inner edges of the inner layer or ply 7 of the casing extend farther one toward the other than the corresponding edges of the outer layer or ply 6, so that when the sub-casing or reliner is lodged within the outer casing 2 the adjacent edges of the layer 7 are brought into close relation and into contact with the corresponding portion of the rim 1 between the inner edges of the beads 3 and thereby form a support for the corresponding portion of the inner tube 4 protecting it against contact with the rim and pinching between the inner edges of the beads 3, the projecting portions of the inner layer 7 providing at this point but a single ply of material.

With the structure as described the bands 14 when the sub-casing or reliner is in position are brought into position opposite the beads 3, so that on the establishment of internal pressure in the inner tube the expansion of the latter tends to force the bands or strips 14 against the beads 3 and the latter against the edges of the rim 1, thus effectually locking the inner edge of the sub-casing or reliner against any tendency to spread and thereby sustaining the inner tube at all points so that the outer casing is well protected against bursting strains even though it be weakened to such an extent that without the presence of the reliner it would be unable to withstand the pressure of the inner tube.

In the particular structure illustrated in the drawings the sides of the reliner from the bands 14 to near the tread portion are five-ply. The tread portion is but four-ply, since the return portions 10 of the layer 8 are not continued into the tread portion. The result of this is that the tread portion of the sub-casing or reliner is more pliable than the side portions, and, therefore, bends easily with the tire, and does not counteract the natural tendency of the latter. This is found in practice to in a very large manner eliminate extra friction which has been found to cause the burning out of the inner tube under high speed or continuous driving. At the same time the side portions of the tire are reinforced to the full extent, since practice has demonstrated that these side portions are particularly liable to blowouts. The fabric employed does not vulcanize to the steel bands 14 and these are in a manner loose within the loops 9. This looseness may be overcome in different ways as by eliminating the smoothness of the steel bands which may be done by roughening these steel bands or by providing them with a coating of some kind, or otherwise. A convenient manner of effectively uniting the steel bands with the fabric of the loops under the action of vulcanization is to apply to each steel band a covering 15 of cloth sewed or otherwise tightly bound upon the band and to this the fabric of the loops 9 will readily unite during the vulcanizing process, wherefore the bands are no longer loose within the loops, but are tightly bound therein against relative displacement with respect to the loops.

The continuation of the edges of the inner layer 7 beyond the loops 9 and the inner edges of the outer layer 6 is advantageous in providing protection for the inner tube without liability of this protecting portion becoming displaced. It has been proposed to provide protection at this point for the inner tube by means of a flap carried by one side of the corresponding portion of the reliner and bridging the space to the other portion of the reliner, but in practice difficulty is found in preventing displacement of such a flap and its proper positioning. These troubles are avoided by the edge continuations of the inner layer 7, which continuations are in a manner stiffened by the vulcanization of the impregnating material, and, therefore, they come together in protecting relation to the corresponding portion of the inner tube.

The sub-casing or reliner of the present invention is made up of a suitable number of plies which have been rubber treated, or constituting frictioned fabric as the material is commercially known. These plies are vulcanized securely together by the open steam or wrapped tread process, and they may be coated with a cement so that when in a tire such a reliner becomes a part of the tire itself. It will be noticed that the tread portion of the reliner of the present invention is more pliable than the side portions, so as to work easily with the tire instead of being crowded bodily toward the rim, in which latter case the outer surface slides on the inner face of the outer casing and causes friction, thereby heating the tire and oftentimes ruining the inner tube, and many times wearing the outer casing or the inner casing sufficiently to render either or both useless. The greater flexibility of the tread portion of the reliner also prevents the break of the tire occurring so far down the side thereof where the outer casing is least able to stand the bending. Moreover, the slipping of one surface on the other as is liable to occur in the stiff types of reliners causes a rolling up of small particles of dirt and rubber resulting in the inner casing creeping and tearing the inner tube at the valve stem.

The sub-casing or reliner is substantially a canvas tube split along the inner edge with the plies united against liability of moving one on the other, and of a strength to sustain the pressure of the air within the inner tube so that the outer casing while snugly inclosing the sub-casing is practically relieved from the pressure by the sub-casing, so that it may be used until worn out irrespective of its ability to withstand internal pressures. The flat frusto-conical bands 14 are prevented by the rim from moving away one from the other, and as these bands are always lodged within the range of the rim the internal pressure is not brought to bear to any material extent upon the outer casing. The bands are sufficiently wide to prevent cutting or injury to either the reliner or the outer casing where engaged by these bands. Moreover, the reliner is resistant to pressure to the full degree where the outer casing is least able to stand such pressure and is more liable to be weakened by wear, and is sufficiently responsive to the bending of the tread portion of the tire at such tread portion of the reliner to allow for the natural action of the tire without tendency of establishing another zone of weakness in the outer casing.

It will be understood that the plies of fabric shown in the drawings are greatly exaggerated as to thickness.

It is found in practice that some tires are either under or over the regular sizes, this being due to a difference in manufacture or to the tires having elongated in use. To allow for such differences which are in fact quite small, provision is made for varying the length of the bands 14, and this may be brought about by providing each band at an appropriate point with a buckle 16 secured to a band and provided in the particular structure shown with a slot 17 and a slot 18 adjacent thereto. One end of the band is passed through the slot 17 of the buckle and is formed into a loop 19, while the other end of the band is threaded through the slot 18 and by drawing on this end to an appropriate extent and flattening it down, the length of the band may be slightly lessened while the band is still effectively endless. To make the buckle 16 and the other end of the band accessible the fabric is slit for a short distance, say, about an inch, where the buckle comes, and that portion of the band carrying the buckle is brought through to the outside of the sub-casing. Attached to the edge of the sub-casing at the point where the buckle is brought through is a flap 20 so arranged that it may be folded back over the buckle after the latter has been adjusted, so that the buckle will not come into contact with the inside of the tire casing. The bands may be adjusted in length to the very small amount necessary after the sub-casing has been put into the tire and before the tire goes on to the rim, although for over-size tires, which are either so manufactured or have stretched, adjustment will not be necessary, at least to so great an extent as when the tires are under size.

This application is a continuation in part of the application filed by me April 19th, 1911, No. 622,098.

What is claimed is:—

1. In an automobile tire, the combination with a formed outer casing having a thickened tread, of an inner or subcasing composed of superimposed united layers of fabric of less number at the tread portion than at the sides.

2. In an automobile tire, the combination with a formed outer casing having a thickened tread, of an inner or subcasing composed of superimposed united layers of fabric of less number at the tread portion than at the sides, and the inner layer of fabric of the subcasing being continued to a substantially equal extent beyond the edge portions of the inner casing and thereby uniting to form a bridge between the beads of the outer casing.

3. A subcasing for introduction into the formed outer casing of an automobile tire, comprising superposed layers of fabric of substantially nonextensible and substantially even texture throughout, the number of layers at the tread portion of the subcasing being less than at the sides thereof.

4. A subcasing for introduction into a formed outer casing of an automobile tire, comprising superposed layers of substantially nonextensible fabric of substantially even thickness throughout, said layers comprising an inner layer of a length cross-sectionally of the subcasing to meet between the beads of the outer casing when in place therein, another layer exterior to the first layer and having its ends returned on themselves toward the tread portion of the tire and stopping short thereof, metal bands lodged in the loops so formed in position to bear against the inner walls of the bead portions of the outer casing, another layer of fabric exterior to the rim portion of the second-named layer and traversing the tread portion of the subcasing and the sides thereof and stopping short of the metal bands, and an exterior layer of fabric extending across the tread portion of the subcasing and along the sides and beyond the loops formed by the return portions of the second-named layer to house said loop portions between the innermost and outermost layers of the subcasing.

5. In an automobile tire, the combination with the outer casing thereof having the tread part stiffer than the side walls, of an inner or subcasing having the tread portion of greater flexibility than the side walls in substantially inverse order to the outer casing and having marginal members adapted to engage the beads of the outer casing in locking relation thereto under the action of air pressure when the tire is inflated.

6. A sub-casing for introduction into a formed outer casing of an automobile tire, comprising superposed layers of substantially nonextensible fabric of substantially even thickness throughout, said layers comprising an inner layer of a length cross-sectionally of the sub-casing to meet between the beads of the outer casing when in place therein, another layer exterior to the first layer and having its ends returned on themselves toward the tread portion of the tire and stopping short thereof, members lodged in the loops so formed in position to bear against the inner walls of the beaded portions of the outer casing, and another layer of fabric exterior to the rim portion of the second-named layer and traversing the tread portion of the sub-casing and the sides thereof.

In testimony, that I claim the foregoing as my own, I have hereto affixed my signature in the presence of two witnesses.

ALBERT H. FISHER.

Witnesses:
C. F. RIDDLE,
PEARL GIBBS.